Feb. 25, 1958
R. J. GITS
2,824,760
DIAPHRAGM TYPE SHAFT SEAL
Filed Nov. 1, 1955
2 Sheets-Sheet 1
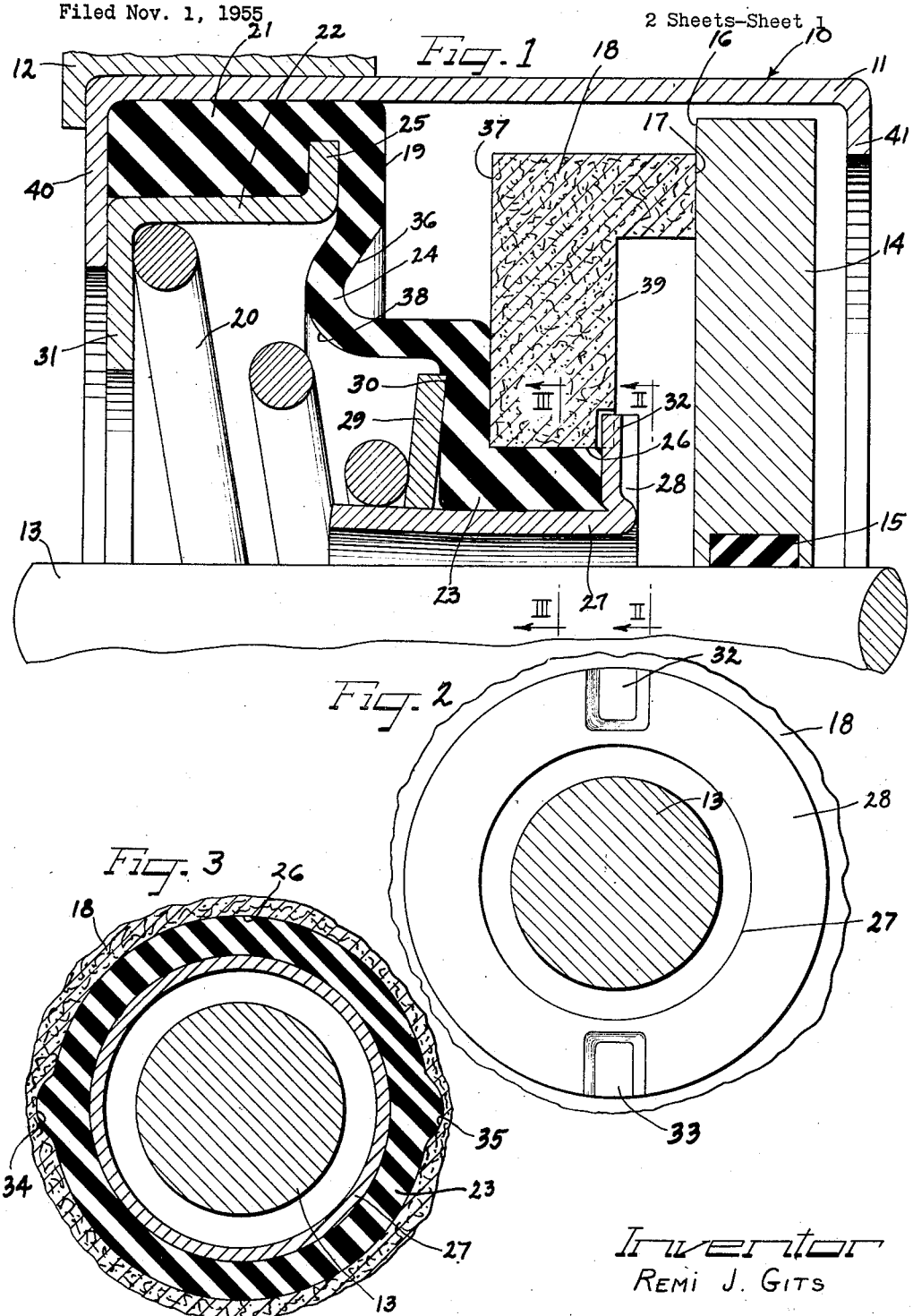
Inventor
Remi J. Gits Feb. 25, 1958  R. J. GITS  2,824,760
DIAPHRAGM TYPE SHAFT SEAL
Filed Nov. 1, 1955
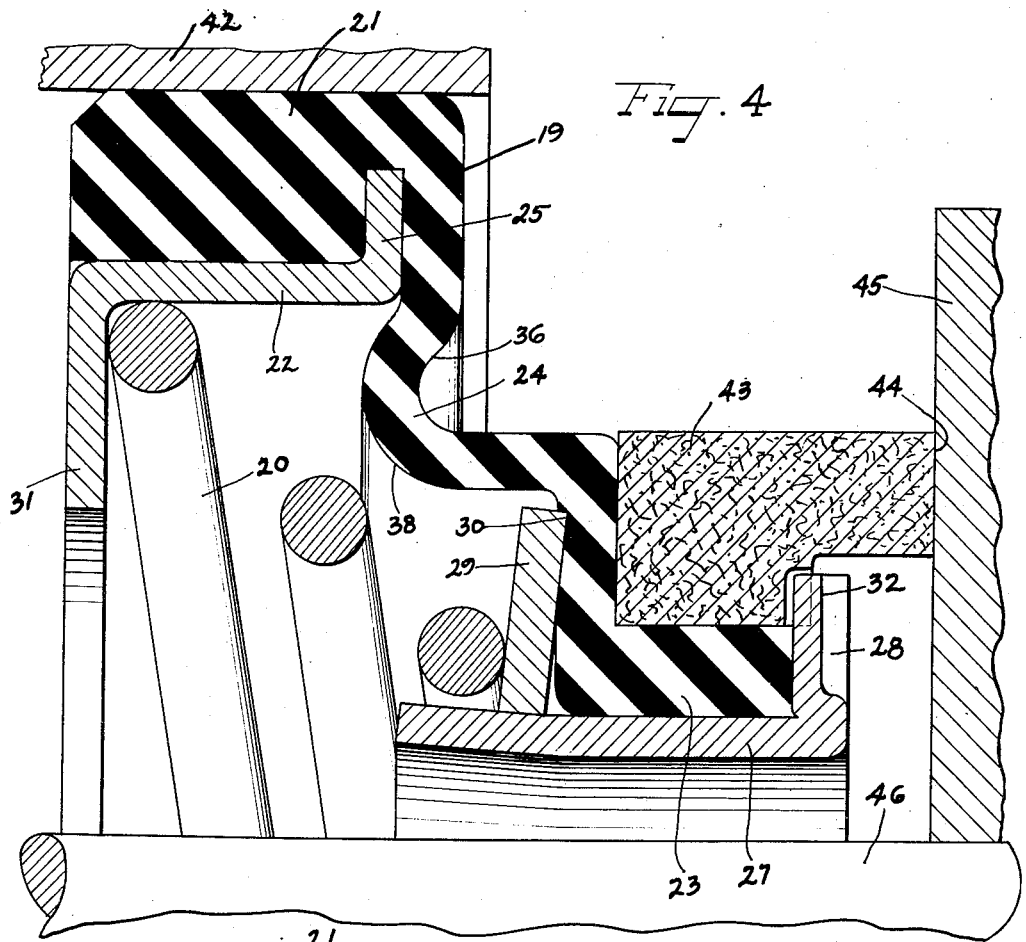
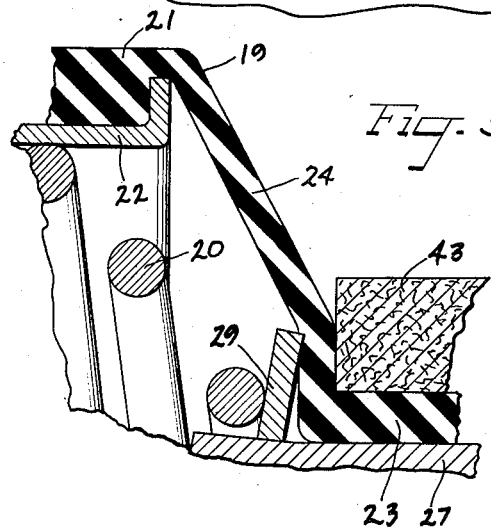
Inventor
Remi J. Gits United States Patent Office 2,824,760
Patented Feb. 25, 1958

2,824,760

DIAPHRAGM TYPE SHAFT SEAL

Remi J. Gits, Hinsdale, Ill., assignor to Gits Bros. Mfg. Co., Chicago, Ill., a corporation of Illinois Application November 1, 1955, Serial No. 544,139

4 Claims. (Cl. 286—11.14)

This invention relates to a shaft seal in which a seal is effected between a pair of relatively rotatable elements such as between a shaft and a wall through which the shaft extends.

In such a seal, a seal ring is carried by one element and has a sealing face in a plane transverse to the axis of relative rotation engaging a like face of the other element. To provide for relative axial movement of the elements, to compensate for wear of the sealing faces and to provide tolerances in mounting of the seal assembly, it is necessary to permit relative axial movement between the seal ring and the element which carries the same and it is, of course, necessary to maintain a seal between the ring and the element carrying the same. This invention relates to a shaft seal of the type in which a diaphragm is provided for effecting such a seal.

A problem heretofore encountered in connection with such seal assemblies is in the connection of the diaphragm to the seal ring and the element from which the ring is supported. Another problem in connection with such seals is in the support of the seal ring which is desirably of a lubricating material such as carbon or the like which materials are generally very brittle. The seal ring supports heretofore provided have not been entirely satisfactory in that they tend to break the seal ring and/or do not securely support the same.

It is further desirable that the seal be as compact as possible and that the parts be readily and economically manufactured and assembled.

An object of this invention is to provide a diaphragm-type shaft seal incorporating an improved diaphragm support and connecting arrangement.

Another object of this invention is to provide a shaft seal including a sealing ring of a brittle lubricating material with improved means for supporting the seal ring.

Another object of this invention is to provide an improved shaft seal in which a seal ring is supported by a diaphragm for axial movement in which the allowable axial movement is at a maximum relative to the size of the assembly.

A further object of this invention is to provide a shaft seal in which the parts are readily and economically manufactured and assembled.

According to this invention, an annular support member of flexible resilient material is provided which includes a pair of sleeve portions and an intermediate diaphragm portion with a seal ring carried by one sleeve portion and with a rigid band pressing the other sleeve portion into engagement with a cylindrical surface of one of a pair of relatively rotatable elements. A specific feature of the invention resides in making the wall of the sleeve portion between the band and the cylindrical surface of substantially greater thickness than the thickness of the wall of the diaphragm portion so as to facilitate mounting of such sleeve portion while having a diaphragm of optimum flexibility.

Another specific feature of the invention is in the provision of an annular flange portion on the rigid band extending radially toward the cylindrical surface at the junction of the sleeve portion and diaphragm portion of the flexible resilient member so as to lock such junction against movement. The diaphragm is thus stretched over the flange portion to allow maximum movement of the seal ring in an axial direction.

It should be noted that this feature is particularly advantageous in combination with the feature in which the sleeve portion has a wall of substantially greater thickness than the diaphragm portion in that the flange portion of the rigid band does not have to bite into the material in order to securely hold the junction between the sleeve portion and the diaphragm portion against movement.

In accordance with a further feature of the invention, one of the sleeve portions of the resilient support member is of substantially greater diameter than the other and a coiled compression spring which is provided to urge the seal ring axially to exert pressure between the sealing faces has a generally conical outline, i. e. spirals outwardly from the smaller diameter sleeve portion to the larger diameter sleeve portion. With this arrangement, the parts are in nested relation and there is a maximum possible axial movement relative to the axial length of the unit.

Still another feature of the invention is in the support of the seal ring which as above noted is desirably of a lubricating material such as carbon. Such materials are very brittle and have little resistance to shearing and tensioning forces as compared to the strength against compressive forces. According to this invention, the seal ring has parallel surfaces facing in axially opposite directions and clamping means on a support band are arranged to engage such oppositely facing surfaces of the seal ring to exert compressive forces thereon. With this arrangement, the seal ring is securely held without any tendency to cause breakage of the same. It may be noted that it has been proposed to exert holding forces against the inside cylindrical surface of the seal ring to hold the same, but such would tension the ring to result in breakage of the same.

This invention contemplates other and more specific objects, features and advantages which will become more fully apparent from the following detailed description taken in conjunction with the accompanying drawings which illustrate preferred embodiments and in which:

Figure 1 is a cross-sectional view of a portion of a shaft seal constructed in accordance with the principles of this invention;

Figures 2 and 3 are sectional views taken along lines II—II and III—III of Figure 1;

Figure 4 is a sectional view of a portion of another preferred form of seal constructed according to the principles of this invention; and Figure 5 is a view corresponding to a portion of Figure 4, on a reduced scale, with the parts being illustrated in different relative positions, to illustrate the flexing action of the diaphragm.

Reference numeral 10 generally designates a shaft seal assembly constructed according to the principles of this invention. The seal assembly 10 comprises a cylindrical support shell 11 which may be secured within an opening of a wall element 12 through which a shaft 13 extends, the purpose of the seal assembly 10 being to provide a seal between the shaft 13 and the wall element 12.

To effectuate this purpose, a disk 14 is disposed within the shell 11 and is secured on the shaft 13, preferably through a sealing washer 15. The disk 14 has a sealing face 16 engaged by a sealing face 17 of a seal ring 18 supported from the shell 11 through a diaphragm member 19 with a coiled compression spring 20 being provided to urge the sealing face 17 toward the face 16.

The diaphragm member 19 comprises a first sleeve portion 21 which is held between a rigid band 22 and the inner cylindrical surface of the shell 11, and a second sleeve portion 23 associated with the seal ring 18. The diaphragm member 19 further comprises an intermediate diaphragm portion 24 interconnecting the sleeve portions 21, 23. The diaphragm portion 24 may have a partially folded configuration as illustrated, to allow maximum axial movement of the seal ring 18 relative to the shell 11.

A specific feature of the invention resides in making the wall of the sleeve portion 21 of substantially greater thickness than the wall of the diaphragm portion 24 so as to facilitate mounting of the sleeve portion 21 while having a diaphragm portion of optimum flexibility. As illustrated, the wall of the sleeve portion 21 has a thickness approximately twice the thickness of the wall of the diaphragm portion 24.

Another specific feature of the invention is in the provision of an annular flange portion 25 on the rigid band 22 which extends radially outwardly toward the inner cylindrical surface of the shell 11 at the junction between the sleeve portion 21 and the diaphragm portion 24 of the diaphragm member 19. With this arrangement, the diaphragm is thus stretched over the flange portion 25 to allow maximum movement of the seal ring in an axial direction relative to the diameter of the assembly.

It will be noted that the provision of the flange portion 25 is particularly advantageous in combination with the feature by which the sleeve portion 21 has a wall thickness greater than that of the diaphragm portion 24, in that the flange portion 25 does not have to bite into the material in order to securely hold the junction between the sleeve portion 21 and the diaphragm portion 24 against movement. In other words, the diaphragm member 19 has substantially the shape illustrated before being installed in the assembly and although the flanged portion 25 is more or less embedded in the diaphragm, the portion of the diaphragm which is radially outside the outer edge of the flange portion 25 is not compressed to any excessive extent.

The sleeve portion 23 of the diaphragm member 19 is disposed between a radially inwardly facing cylindrical surface 26 of the ring 18 and the outer surface of a cylindrical sleeve 27. The sleeve portion 23 could be compressed to such an extent as to securely hold the ring 18 on the sleeve 27. However, such would develop tension in the ring 18 and might easily result in cracking of the same, the ring 18 being of a brittle lubricating material such as carbon which has little resistance to shearing and tensioning forces. Such materials, however, have a relatively high strength with respect to compressional forces and according to an important feature of the invention, a portion of the ring 18 is held between an annular flange 28 of the sleeve 27 and a washer 29, a radially extending portion of the diaphragm member 19 being disposed between the washer 29 and the seal ring 18.

It is of importance that the washer 29 has a slightly dished configuration such that an outer edge portion 30 thereof bites into the diaphragm member 19 at a point spaced a substantial distance from the inner surface 26 of the ring 18. With this arrangement, the pressure exerted on the ring 18 is more uniformly distributed, to exert more uniform compressive forces on the portion of the ring 18 disposed between the flange 28 and washer 29. It may be noted that the washer 29 and band 22 are preferably formed by a stamping operation from a single member, the washer 29 having an outer diameter equal to the inner diameter of a flange portion 31 on the band 22 which is engaged by the spring 20. In the stamping operation, the washer 29 will take a dished configuration as illustrated. It was once thought necessary to straighten the washer 29 out but it was found that straightening was not only not necessary but that greatly improved results were achieved by using the dished configuration.

In assembly, the washer 29 is slipped on the sleeve 27 and pressed against the diaphragm member 19. A tapered tool is then inserted into the end of the sleeve 27 to expand an end portion thereof and move and lock the washer 29 tightly against the diaphragm member 19.

To prevent rotation of the ring 18 relative to the sleeve 27, the ring 18 is formed with recesses at diametrically opposite points to receive projections 32 and 33 formed by deformation of the flange 28. In addition, the inner surface 26 of the ring 18 has recesses 34 and 35 which receive projection of the sleeve portion 23 of the diaphragm member 19, the recesses 34, 35 being preferably located at diametrically opposite positions in a line at right angles to a diametrical line through the projections 32, 33 of the flange 28.

It will be noted that the sleeve portion 21 of the diaphragm member 19 has a diameter substantially greater than the sleeve portion 23 and the coiled spring 20 has a generally conical outline so that it spirals outwardly from a small diameter convolution adjacent the sleeve portion 23 to a large diameter sleeve portion engaged with the flange 31 adjacent the sleeve portion 21. With this arrangement, the parts are in nested relation and there is a maximum possible axial movement of the seal ring 18 relative to the axial length of the unit. It will be noted that since the adjacent convolutions of the spring 20 are of different diameters, the convolutions cannot engage each other to limit axial movement. It may be further noted that this arrangement has an advantage from the standpoint of economy of manufacture of the unit because, as above noted, the band 22 and washer 29 can be stamped from a single member.

A feature of the seal assembly 10 is in the configuration of the seal ring 18 in relation to the other component elements such that a pressure balance is obtained. Fluid under pressure in the space on one side of the seal will act against one surface 36 of the diaphragm portion 24 to produce a force urging the seal ring 18 away from the mating disk or ring 14. However, such fluid under pressure is also applied to a surface portion 37 of the ring 18 to develop a balancing force urging the ring 18 toward the mating ring 14.

Fluid under pressure in the space on the opposite side of the seal will act on a surface 38 of the diaphragm portion 24 and against the surface of the washer 29 to urge the ring 18 toward the mating ring 14 and such fluid under pressure will also act against a surface portion 39 of the seal ring 18 and against the surface of the flange 28 to produce a balancing force urging the ring 18 away from the mating ring 14. Accordingly, a balancing action is achieved, and the only limitation imposed with respect to pressure that can be sealed is the strength of the diaphragm.

The shell 11 is provided with end flanges 40 and 41 to lock all of the component elements of the assembly therewithin, so as to form a complete seal unit. In some applications, it is not necessary or desirable to provide such a complete unit and in that event, the shell 11 may be dispensed with and as shown in Figure 4, the sleeve portion 21 of the diaphragm member 19 may be directly engaged in an opening in a wall element 42.

Figure 4 also illustrates a seal ring 43 having a sealing face 44 engaged with the face of a mating ring 45 carried by a shaft 46. The seal ring 43 is considerably smaller than the seal ring 18, and does not have surface portions of substantial areas such as the surface portions 37, 39 of the seal ring 18, so that a pressure balance is not obtained. However, the ring 43 may be used to advantage in application in which high pressure fluid is applied to act on the inside surface 38 of the diaphragm portion 24, so that the pressure between the sealing faces is increased with increases in fluid pressure, there being no problem with respect to separation of the sealing faces.

Figure 5 illustrates the manner in which the diaphragm portion 24 is stretched, and illustrates how a large amount of axial movement of the seal ring is possible with the construction of this invention.

It should be noted that torque is transmitted between the band 22 and sleeve 27 through the spring 20 and the ends of the spring 20 are bent to extend into openings (not shown) in the flange 31 and washer 29. The washer 29 also has openings receiving extensions of the diaphragm member 19 to more securely lock the diaphragm member 19 and ring 18 against rotation relative thereto.

It will be understood that modifications and variations may be effected without departing from the spirit and scope of the novel concepts of this invention.

I claim as my invention:

1. In a shaft seal or the like arranged to effect a seal between a pair of relatively rotatable elements, a seal ring having a sealing face arranged to coact with a like sealing face on one of the relatively rotatable elements and having surfaces facing in axially opposite directions, a support sleeve for said seal ring, means on said sleeve for engaging one of said surfaces, a resilient member for engaging the other of said surfaces, and means on said sleeve for urging said resilient member against said other of said surfaces and having an annular edge arranged to bitingly engage said resilient member at a point spaced radially outwardly a substantial distance from the inner surface of said seal ring.

2. In a shaft seal or the like arranged to effect a seal betwen a pair of relatively rotatable elements, a seal ring having a sealing face arranged to coact with a like sealing face on one of the relatively rotatable elements and having surfaces facing in axially opposite directions, a support sleeve for said seal ring, means on said sleeve for engaging one of said surfaces, a resilient member for engaging the other of said surfaces, and a washer on said sleeve for urging said resilient member against said other of said surfaces, said washer having a dished configuration such as to provide an annular edge arranged to bitingly engage said resilient member at a point spaced radially outwardly a substantial distance from the inner surface of said seal ring.

3. In a shaft seal or the like arranged to effect a seal between a pair of relatively rotatable elements, a seal ring having a sealing face arranged to coact with a like sealing face on one of the relatively rotatable elements and having surfaces facing in axially opposite directions, a support sleeve for said seal ring, means on said sleeve for engaging one of said surfaces, a resilient member for engaging the other of said surfaces, and a washer on said sleeve for urging said resilient member against said other of said surfaces, said washer having a dished configuration such as to provide an annular edge arranged to bitingly engage said resilient member at a point spaced radially outwardly a substantial distance from the inner surface of said seal ring, the end portion os said sleeve adjacent said washer being expanded to move said washer tightly against said resilient member.

4. In a shaft seal or the like arranged to effect a seal between a pair of relatively rotatable elements, a seal ring having a sealing face arranged to coact with a like sealing face on one of the relatively rotatable elements and having surfaces facing in axially opposite directions, a support sleeve for said seal ring having a flange for engaging one of said surfaces, a diaphragm of resilient material having a sleeve portion between said support sleeve and the inner surface of said seal ring and having a radial wall portion engaging the other of said surfaces, means on said support sleeve urging said radial wall portion against said other of said surfaces, interlocking projection and recess means on said flange and said seal ring, and interlocking projection and recess means on said sleeve portion of said diaphragm and said seal ring, for locking the elements against relative rotation.

References Cited in the file of this patent

UNITED STATES PATENTS

| | | |
|---|---|---|
| 2,308,114 | Schjolin | Jan. 12, 1943 |
| 2,328,160 | Marvin | Aug. 31, 1943 |
| 2,347,118 | Matter | Apr. 18, 1944 |
| 2,392,763 | Peterson et al. | Jan. 8, 1946 |
| 2,712,459 | Wahl | July 5, 1955 |

FOREIGN PATENTS

| | | |
|---|---|---|
| 648,814 | Great Britain | Jan. 10, 1951 |